United States Patent
Hall et al.

(10) Patent No.: US 8,949,983 B2
(45) Date of Patent: Feb. 3, 2015

(54) SYSTEM AND METHOD FOR INTEGRITY RECONSTITUTION

(75) Inventors: Brendan Hall, Eden Prairie, MN (US); Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 229 days.

(21) Appl. No.: 13/401,365

(22) Filed: Feb. 21, 2012

(65) Prior Publication Data

US 2013/0219491 A1 Aug. 22, 2013

(51) Int. Cl.
*G06F 11/00* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | |
|---|---|---|---|
| 5,751,932 A | 5/1998 | Horst | |
| 5,838,894 A | 11/1998 | Horst | |
| 6,233,702 B1 | 5/2001 | Horst | |
| 6,622,258 B1 | 9/2003 | Lee et al. | |
| 6,651,106 B1 | 11/2003 | Driscoll | |
| 7,372,859 B2 | 5/2008 | Hall et al. | |
| 7,502,334 B2 | 3/2009 | Hall et al. | |
| 7,606,179 B2 | 10/2009 | Hall et al. | |
| 7,649,835 B2 | 1/2010 | Hall et al. | |
| 7,656,881 B2 | 2/2010 | Hall et al. | |
| 7,668,084 B2 | 2/2010 | Driscoll et al. | |
| 7,668,204 B2 | 2/2010 | Hall et al. | |
| 7,729,297 B2 | 6/2010 | Hall et al. | |
| 7,778,159 B2 | 8/2010 | Driscoll et al. | |
| 7,889,683 B2 | 2/2011 | Paulitsch et al. | |
| 7,912,094 B2 | 3/2011 | Hall et al. | |
| 8,130,773 B2 | 3/2012 | Hall et al. | |
| 2005/0129037 A1 | 6/2005 | Zumsteg et al. | |
| 2005/0129038 A1* | 6/2005 | Hall et al. | 370/404 |
| 2005/0152379 A1 | 7/2005 | Hall et al. | |
| 2006/0092856 A1 | 5/2006 | Mitsumori | |
| 2008/0144668 A1* | 6/2008 | Hall et al. | 370/503 |
| 2009/0086653 A1 | 4/2009 | Driscoll et al. | |
| 2009/0116502 A1 | 5/2009 | Hall et al. | |
| 2010/0284301 A1 | 11/2010 | Paulitsch et al. | |

(Continued)

OTHER PUBLICATIONS

Driscoll et al., "System and Method for Out-Of-Band Signaling", "U.S. Patent Application filed Feb. 21, 2012", Feb. 21, 2012, pp. 1-22.

(Continued)

*Primary Examiner* — Esther Benoit
(74) *Attorney, Agent, or Firm* — Fogg & Powers LLC

(57) ABSTRACT

A method of communicating data in a network comprises receiving a copy of a message on a first channel via at least one of a first port and a second port, the first port coupled to a first neighbor node and the second port coupled to a first neighbor's neighbor node; and selecting either the copy of the message received via the first port or the copy of the message received via the second port if a copy of the message is received via both the first port and the second port. If a copy of the message is only received via one of the first port or the second port, the received copy of the message is selected. The selected copy of the message is forwarded on the first channel to a second neighbor node via a third port and to a second neighbor's neighbor node via a fourth port; and the integrity of the selected copy of the message is determined based on supplemental integrity data received from another node, wherein the supplemental integrity data is exclusive of a copy of the message communicated on a second channel.

12 Claims, 8 Drawing Sheets

(56) References Cited

U.S. PATENT DOCUMENTS

2013/0182552 A1 7/2013 Hall et al.
2013/0215905 A1 8/2013 Driscoll et al.

OTHER PUBLICATIONS

Hall et al., "Virtual Pairing for Consistent Data Broadcast", "U.S. Appl. No. 13/350,304, filed Jan. 13, 2012", Jan. 13, 2012, pp. 1-22.

Paulitsch et al, "Starting and Resolving a Partitioned Brain", 11th IEEE Symposium on Object Oriented Real-Time Distributed Computing, May 2008, pp. 415-421, IEEE Computer Society.

Driscoll, Kevin, "AADL Error Modeling of Different Network Protocols", SAE AADL Meeting, Apr. 2011, pp. 1-18, Honeywell.

U.S. Patent and Trademark Office, "Office Action", "from U.S. Appl. No. 13/350,304", Mar. 3, 2014, pp. 1-11, Published in: U.S.

\* cited by examiner

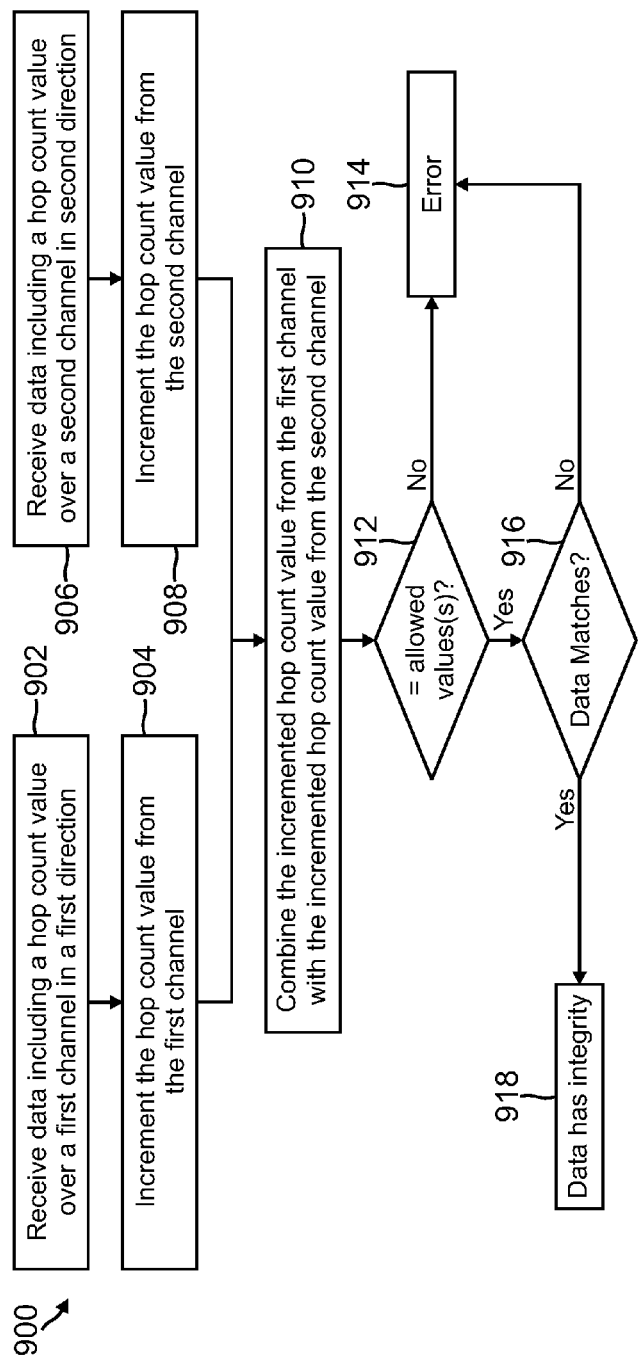
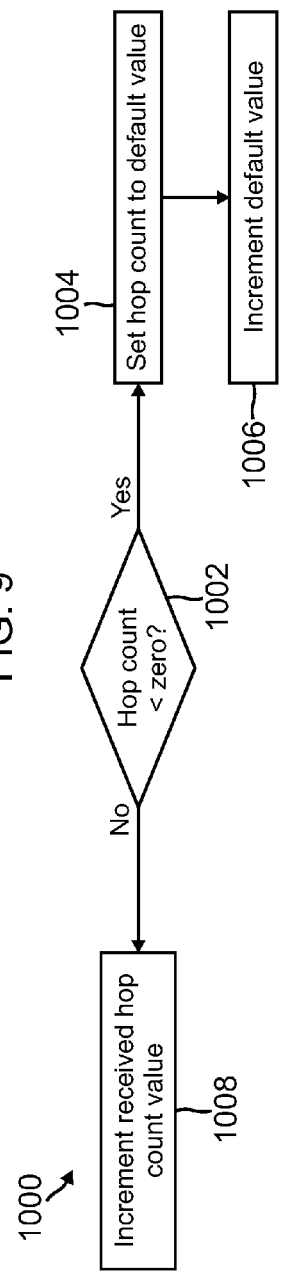
FIG. 9
FIG. 10

SYSTEM AND METHOD FOR INTEGRITY RECONSTITUTION

BACKGROUND

In some communication systems, the integrity of a received frame or message is used to determine if a receiving node can use or trust the contents of the message. For example, faults can cause the message content to become corrupted. In some systems, the integrity of message content is verified by comparing the data received over a first channel with a corresponding copy of the data received over a second channel. However, the duplication of each message for transmission to each node on a ring network can reduce the bandwidth available for use by the ring network.

SUMMARY

In one embodiment, a method of communicating data in a network is provided. The method comprises receiving a copy of a message on a first channel via at least one of a first port and a second port, the first port coupled to a first neighbor node and the second port coupled to a first neighbor's neighbor node; and selecting either the copy of the message received via the first port or the copy of the message received via the second port if a copy of the message is received via both the first port and the second port. If a copy of the message is only received via one of the first port or the second port, the received copy of the message is selected. The selected copy of the message is forwarded on the first channel to a second neighbor node via a third port and to a second neighbor's neighbor node via a fourth port; and the integrity of the selected copy of the message is determined based on supplemental integrity data received from another node, wherein the supplemental integrity data is exclusive of a copy of the message communicated on a second channel.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 9 is a flow chart of one embodiment of a method for checking the integrity of the received data based on the hop count value.

FIG. 10 is a flow chart of one embodiment of a method for incrementing the hop count value at each of the receiving nodes.

Figure 1:
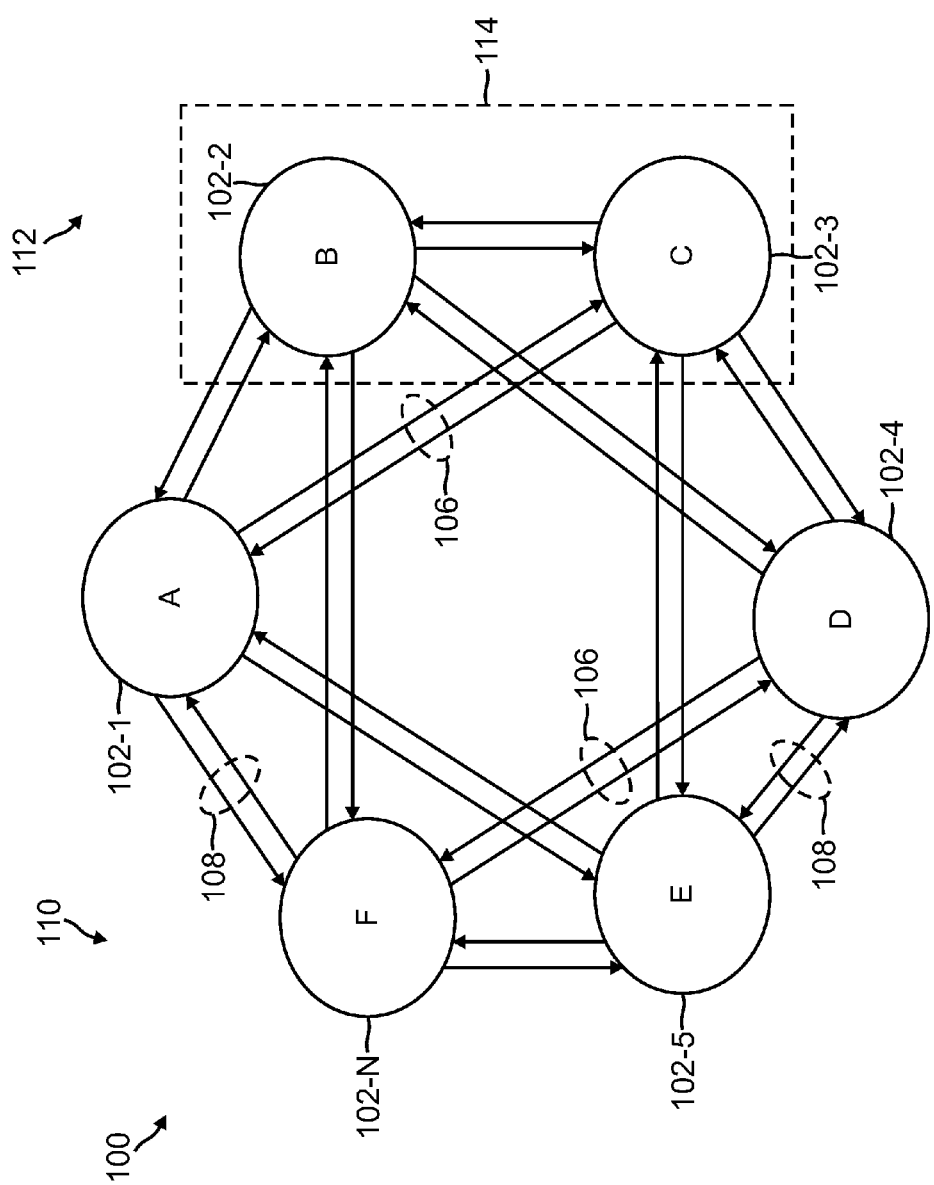
FIG. 1 is a block diagram of one embodiment of a communication network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one embodiment of a communication network 100. Communication network 100 includes a plurality of nodes 102-1 ... 102-N. The nodes of FIG. 1 are individually referenced herein as node A through node F. Although six nodes are shown in FIG. 1, it is to be understood that any number of nodes can be used in other embodiments. Each of the nodes 102 is coupled to each of its immediate or adjacent neighbors (also referred to herein as "direct neighbors", "adjacent nodes", or "neighbor nodes") via respective direct links 108 and to each of its direct neighbor's neighbor (also referred to herein as "skip neighbors", "skip nodes", or "neighbor's neighbor nodes") via respective skip links 106. Thus, each node 102 in the exemplary network 100 has two "neighbor" nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node A are node B in the clockwise direction and node F in the counter-clockwise direction. In addition, each node 102 has two neighbor's neighbor nodes 102, in this example, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node A are node C in the clockwise direction and node E in the counter-clockwise direction.

As used herein, when a link 106/108 is described as being connected 'from' a first node 102 'to' a second node 102, the link 108 provides a communication path for the first node 102 to send data to the second node 102 over the link 106/108. That is, the direction of that link 106/108 is from the first node 102 to the second node 102. As shown in FIG. 1, direct links 108 and skip links 106 are implemented using full-duplex bi-directional links. However, it is to be understood that, in other embodiments, direct links 108 and skip links 106 are implemented using half-duplex bidirectional links.

For the sake of illustration, the details of nodes 102 are not shown in FIG. 1. However, it is understood that the nodes 102 are implemented using suitable hardware and/or software to implement the functionality described here as being performed by the nodes 102. Each such node 102 also includes a suitable network or other interface for communicatively coupling that node to the links 108 and 106. Examples of suitable node implementations are described in the U.S. Pat. No.

7,606,179 and the U.S. Pat. No. 7,372,859, both of which are incorporated herein by reference in their entirety, though it is to be understood that the nodes 102 can be implemented other ways The links 106 and 108 are used to form at least two logical communication channels. In the particular embodiment shown in FIG. 1, the first logical communication channel 110 comprises a communication path around the ring in a first direction (for example, in a counter-clockwise direction), and the second logical communication channel 112 comprises a communication path around the ring in a second direction (for example, in a clockwise direction). Each node 102 of the network 100 is communicatively coupled to at least one of channels 110 and 112.

For the respective direction in which data flows in the channels 110 and 112, the channels 110/112 communicatively directly couple (that is, with only one hop) each node 102 to at least two other nodes 102 from which that node 102 receives data (also referred to herein as "receive-from nodes") and to at least two other nodes 102 to which that node 102 transmits data (also referred to here as the "transmit-to nodes"). In one embodiment, one of the received-from nodes 102 is designated as a "primary" receive-from node 102 and the other receive-from node 102 is designated as a "secondary" receive-from node 102. When a node "relays" data on channels 110/112 in the respective direction, the node 102 receives data from one or more receive-from nodes and forwards the received data onto the one or more transmit-to nodes. That is, when a node 102 is relaying data, the node 102 is not the source of the data that the node 102 is forwarding onto other nodes. In some embodiments, when a node 102 "relays" data, that node 102 receives data from the primary receive-from node 102 and forwards the receive data onto each of the transmit-to nodes designated for that node 102. Data received by a node from the secondary receive-from nodes 102 is used for the various comparison operations described below and/or is relayed in the event that suitable data is not received from the primary receive-from node. When a given node 102 "transmits" data (that is, when the given node 102 is the source of data communicated on the network 100) along channels 110/112, that node 102 transmits the data to each of the transmit-to nodes 102 designated for that node 102 for the respective channel 110/112.

In the particular embodiment shown in FIG. 1, the nodes 102 are arranged in a ring having a "braided ring" topology in which the nodes 102 communicate with one another over multiple communication channels 110/112 as described above. In the particular embodiment shown in FIG. 1, six nodes 102 communicate with one another over two replicated communication channels 110/112. In other embodiments, a different number and/or type of nodes 102 and/or channels 110/112 and/or a different network topology are used.

Embodiments of network 100 are implemented using various media access schemes. For example, the embodiment shown in FIG. 1 is described herein as being implemented using time division multiple access (TDMA) media access scheme (for example, the media access scheme implemented in the TTP/C or FLEXRAY protocols). In other embodiments, other media access schemes are used.

In the particular embodiment shown in FIG. 1, for channel 110, the receive-from nodes for each node 102 are that node's clockwise neighbor and clockwise neighbor's neighbor and the transmit-to nodes for each node 102 are that node's counter-clockwise neighbor and counter-clockwise neighbor's neighbor. In some embodiments, the primary receive-from node on channels 110 and 112 is each node's neighbor's neighbor node. However, in other embodiments, the primary or default receive-from node is each node's neighbor node. In yet other embodiments, the primary receive-from node varies from node to node as described in more detail below.

In the particular embodiment shown in FIG. 1, the network 100 is implemented as a peer-to-peer network in which each transmission is intended to be received by each node 102 of the network 100. In other embodiments, each transmission is intended for a particular destination node. Moreover, in the embodiments described here, data is communicated in the network 100 in the form of frames of data though it is to be understood that, in other embodiments, other units of data are communicated over the network 100. Furthermore, as used herein, the term "frame" is used interchangeably with the term "message".

As used herein the term "high integrity" or "trusted integrity" means that the message content has been verified to contain the same content as originally transmitted from the message source within some pre-defined tolerance levels. Similarly, as used herein, the terms "low integrity", "questionable integrity" or "uncertain integrity" are defined to mean that the message content has not been verified to contain the same content as originally transmitted from the message source. Thus, as used herein, the term "reconstitute integrity" refers to a process of verifying the message content of a message that has been indicated to have questionable integrity. Additionally, the term "reconstituting integrity" is also referred to herein as "determining integrity".

Figure 2:
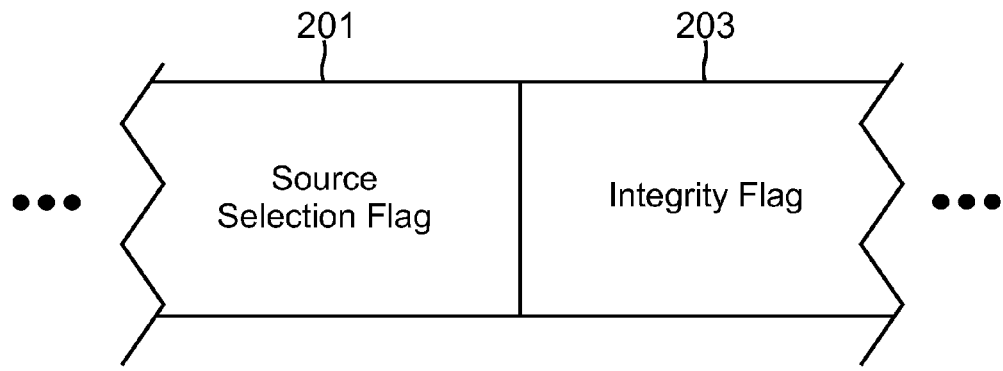
FIG. 2 is a partial block diagram of one embodiment of an exemplary frame format.

At least one of the nodes 102 in the network 100 is configured to reconstitute the integrity of a received message that has questionable or uncertain integrity without comparing copies of the messages from both channels 110 and 112. In other words, at least one of the nodes 102 is configured to reconstitute the integrity of a message received on only one of the channels, as described in more detail below. In some embodiments, to aid in reconstitution of integrity, each message has an integrity flag which indicates whether or not the message has high or low integrity and a source selection flag which indicates from which input port the frame being forwarded was received. In particular, the source selection flag indicates if the frame being forwarded was received over a direct link from a neighbor node or over a skip link from a neighbor's neighbor node. In some embodiments, each node 102 includes the integrity flag and the source selection flag in forwarded frames or adjacent to forwarded frames. For example, as shown in FIG. 2, the source selection flag and the integrity flag can be implemented as fields 201 and 203, respectively, in the forwarded frames. In other embodiments, the integrity flag and the source selection flag can be transmitted using an out-of-band signaling mechanism described in co-pending U.S. patent application Ser. No. 13/401390 which is filed on even date herewith and incorporated herein by reference in its entirety.

It should be noted that the fields 201 and 203 can be located at any point in or adjacent to the frame, such as, but not limited to, at the end of the frame or in a header of the frame. In addition, the fields 201 and 203 are not located adjacent to one another in other embodiments. The field values can be appended or prepended to the forwarded frames. As used herein, the term "appended" is defined to include inserting values into an existing field of the forwarded frame, adding a new field and corresponding value to the forwarded frame, or toggling one or more bits of a value already present in an existing field of the forwarded frame.

To prevent a node 102 from accepting a message which was erroneously labeled as having high integrity, each node 102 performs an integrity check on the received messages. In previous systems, such as the system described in the U.S.

Pat. No. 7,502,334 or U.S. Pat. No. 7,606,179, both of which are incorporated herein by reference in their entirety, each node 102 needed to receive one or more copies of the message from each channel in order to reconstitute the integrity of a message. However, in the embodiments described herein, at least one of the nodes 102 is configured to reconstitute the integrity of a message received on only one channel 110 or 112. Thus, the at least one node 102 reconstitutes the integrity without comparing a copy of the message from one channel with the copy of a message from the other channel. Additional line encoding and frame correctness checks, such as a cyclic redundancy checks (CRC), can be performed to ensure that the received message was not corrupted by environmentally induced errors or noise.

For example, when a node 102 (node F in this example for purposes of explanation) receives a frame on a skip and direct link from the same channel (channel 110 in this example), node F uses the source selection flag and integrity flag to verify the integrity of the received frame. In particular, if the frame received on each of the skip and direct links match and both have an integrity flag indicating high integrity then node F determines that the frame has high integrity for local use by node F. In addition, node F forwards one of the received frames on channel 110 over both the skip link and the direct link with an indication that the forwarded frame has high integrity. Node F also sets the source selection flag to indicate from which link the forwarded frame was received. Additional details regarding the selection of a link for frame forwarding is discussed in more detail below.

If the frame received over the skip link does not match the frame received over the direct link, node F selects one of the frames to forward and sets the integrity flag to indicate low or questionable integrity. Similarly, if the frames received over the skip and direct links match, but neither frame has an integrity flag indicating high integrity, node F forwards one of the received frames and sets the integrity flag to low integrity. However, if the received frames match and the integrity flag of one of the received frames indicates low integrity while the integrity flag of the other frame indicates high integrity, node F may reconstitute the integrity of the received frames based on the source selection flag of the received frames. In particular, if the source selection flag of the frame received over the direct link from node A indicates that the frame forwarded from node A was received on a skip link, then node F sets the integrity of the frame to high and forwards the frame on channel 110 with high integrity. If, however, the source selection flag from node A indicates that the forwarded frame was received over a direct link, then node F forwards the frame with low integrity.

Hence, the source selection flags are used by node F to determine if the received frames have traveled independent paths. For example, node F receives a frame over the skip link from node B. If the frame received over the direct link from node A indicates that the frame was received at node A over a skip link, then the frame forwarded by node A was received from node C. Thus, the frames have traveled independent paths. However, if the frame received from node A indicates that the frame was received at node A over the direct link, then the path traveled by both frames received at node F passes through node B. Consequently, the paths in such case would not have traveled independent paths and node F does not reconstitute the integrity. The source selection flag is also referred to herein as path data or source data.

In addition, in this example, the source of the frame is a high-integrity source such as a self-checking pair 114. The nodes B and C of the self-checking pair 114 verify the integrity of a message prior to transmitting the frame to the other nodes of the network 100. Additional details regarding the self-checking pair can be found in U.S. Pat. No. 7,372,859 which is hereby incorporated herein by reference. Alternatively, in some embodiments, the high-integrity source is a triple modular redundant (TMR) set such as the TMR set described in co-pending U.S. application Ser. No. 11/935,343 which is incorporated herein by reference. In addition, in some embodiments, the source of the data is a virtual self-checking pair such as the virtual self-checking pair described in co-pending U.S. application Ser. No. 13/350,304, which is hereby incorporated herein by reference.

Although nodes B and C form a self-checking pair 114 in this example, it is to be understood that other nodes can form a high-integrity source to transmit frames in other timeslots. In addition, although a high-integrity source is used to transmit the frame, if a link or node malfunctions, subsequent nodes 102 may only receive a frame on one link or the frames may not match. Hence, the integrity of the frame cannot be verified when such faults occur. However, using the source selection and integrity flags, nodes 102 of network are able to reconstitute the integrity based only on frames received from one channel.

Thus, in embodiments of network 100 implementing the source selection flag and integrity flag, each node is configured to set the status flag and the integrity flag of a forwarded frame. In addition, the source node of a frame is configured to set the integrity flag as high integrity. The source node is also configured, in some embodiments, to set the source selection flag to a default value indicating that the frame was taken from a skip link. In other embodiments, the source node sets the source selection flag to a value indicating that it is the source of the data.

As discussed above, each node selects one of the received frames for forwarding. In some embodiments, the default or primary receive-from link is chosen based on the location of the node in relation to the source. For example, if a node is located adjacent to the sending node via only a direct link 108, the direct link is set as the primary receive-from link. If a node is located adjacent to the sending node via only a skip link 106, the skip link is set as the primary receive-from link. If a node is adjacent to the sending nodes of a self-checking pair via both the direct link 108 and the skip link 106, the skip link is selected as the primary receive-from link. Similarly, if the node is not adjacent to the sending node via either the direct link 108 or the skip link 106, then the skip link is selected as the primary receive-from link. The location of the node in relation to the sending node(s) can be determined with a transmission schedule, such as a time division multiple access (TDMA) transmission schedule.

In other embodiments, at least one node 102 is configured to reconstitute the integrity of a received frame without comparing frames received over both channels using alternative techniques. For example, in one alternative embodiment, at least one node 102 is configured to reconstitute the integrity of a received frame using a signaled reconstitution acknowledgment received from another node 102. As used herein a signaled reconstitution acknowledgment is an acknowledgment signaled by a node that received the forwarded frame and that indicates that the forwarded frame from one channel 110/112 matches a forwarded frame from the other channel 112/110 that traveled an independent path.

Figure 3:
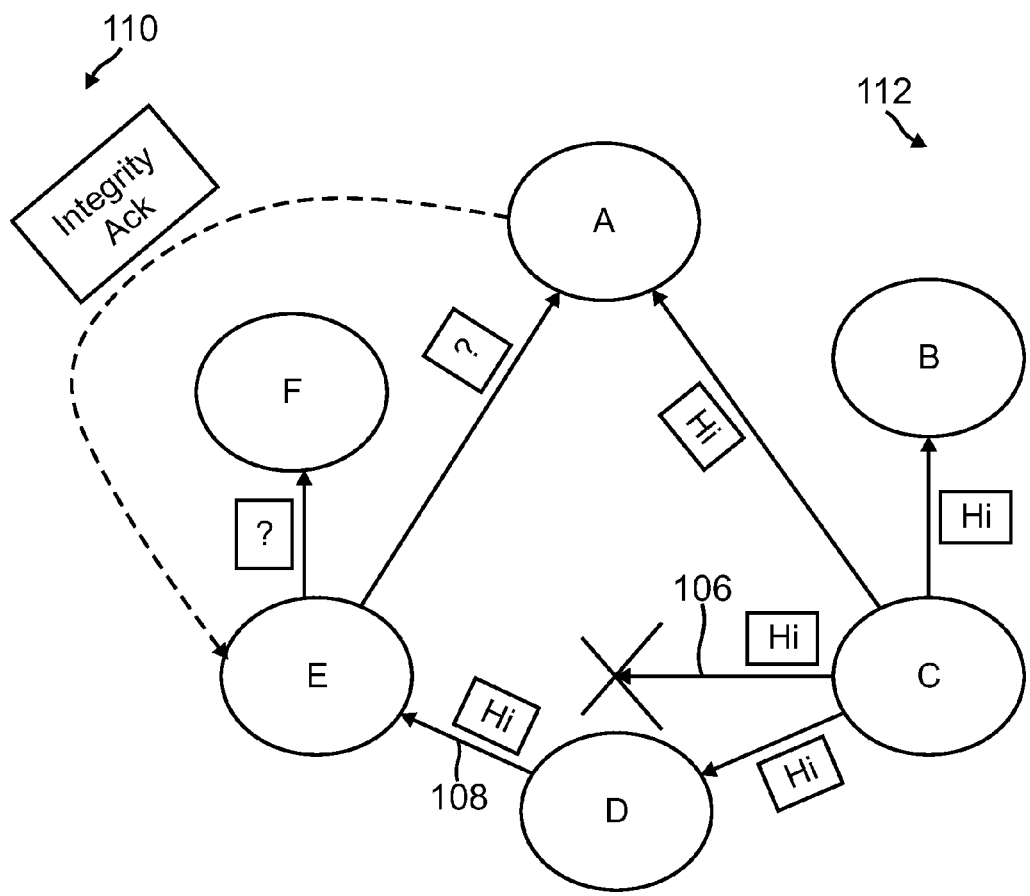
FIG. 3 is a block diagram depicting exemplary propagation of a message in one embodiment of a network.

For example, in operation, node C sources a frame on each of its ports, as shown in FIG. 3. Each frame includes an integrity flag which indicates that the frame has high (Hi) integrity. For purposes of illustration, only the integrity flag is depicted in FIG. 3. However, it is to be understood that the frames can also include a source selection flag as well as other conventional fields, such as a header, payload, CRC field, etc.

Node D forwards the frame received from node C onto node E via a direct link 108. Absent a failure, node E receives frames on channel 112 from node D over a direct link 108 and from node C over a skip link 106. However, if one of the links fails, such as the skip link 106 between node C and node E, node E selects the frame from node D for forwarding. However, node E sets the integrity flag of the forwarded frame to questionable (the questionable integrity flag is depicted as a "?" in FIG. 3) since node E only received one frame. Another node 102 receives the frame forwarded by node E on channel 112 as well as a corresponding frame communicated on channel 110. For example, node A receives the frame forwarded from node E on channel 112 via a skip link 106 and a corresponding frame on channel 110 via a skip link 106 from node C.

Since node A received a frame from both channels, node A performs a comparison of the frame from both channels 110/112. Since the frames are received on different channels, node A knows that the frames traveled independent paths. In addition, in some embodiments, node A utilizes a hop count field in each frame, as described in more detail below, to verify that the frames were sourced from the same node. If the frames match (and hop count value is acceptable), node A signals a reconstitution or integrity acknowledgment to node E to indicate that the frame forwarded from node E matches a frame from the other channel. The integrity acknowledgment can be signaled outside the normal data flow.

In some embodiments, the node which compares the frames, node A in this example, signals the reconstitution acknowledgment only on those links over which a matching frame was received. For example, if the frame from node E over a skip link 106 matches a frame on a direct link 108 from node B, then the reconstitution acknowledgment is signaled on the direct link 108 to node B and on the skip link 106 to node E. If the frame from node E matches a frame on the direct link from node B and the skip link from node C, then node A signals the reconstitution acknowledgment on the skip link 106 to node E, the skip link to node C and the direct link to node B.

Node E uses the signaled reconstitution acknowledgment to reconstitute the integrity of the frame and accept it for local use even though node E has not performed a comparison of the frame. Hence, in the event of a failure, such as a link failure, which prevents a node from receiving more than one copy of the frame, the node is still able to reconstitute the integrity of the received frame based on the signaled reconstitution acknowledgment.

In addition, the signaled reconstitution acknowledgment can be used to reduce the bandwidth required to communicate the frame to each node over both channels 110/112. For example, one or more of the nodes in network 100 can be designated as a nadir node to terminate the continued propagation of a frame to additional downstream nodes 102 along a channel and to compare the corresponding frames both channels 110/112. For example, node A can be designated as a nadir node in some embodiments. Thus, node A receives the frame forwarded by node E on a skip link 108 and a corresponding frame on direct link 108 from node B. Node A does not forward the frame from node B. Rather node A performs a comparison of the frame received from node E to the frame received from node B. If the frames match, node A signals a reconstitution acknowledgment to node E and node B. In this manner, node E is able to reconstitute the integrity of the forwarded frame without bandwidth required to forward a copy of the frame to node E via channel 110.

Furthermore, in some embodiments, one or more of the nodes 102 is configured to dynamically select a source link for forwarding frames in order to isolate failures on an input link. For example, as described above, when a frame is received on both the skip and direct links for a given channel, a primary receive-from or default link is set for forwarding of frames on that channel in some embodiments. A node configured to dynamically select a link to forward stores the forwarded frame and the non-selected frame in a buffer. After receiving a copy of the frame from the direct and skip links of the other channel, the node compares the different copies of the frame with each other similar to the comparisons for reconstitution of integrity described in U.S. Pat. No. 7,606,179. However, rather than use the comparisons for integrity reconstitution, the node uses the comparisons to determine from which link to forward future received frames. The node can also compare the hop count values, as described below, to qualify the source of the received frames in order to select which link to use as the default link.

For example, in some embodiments, the primary receive-from link is the skip link. However, if after comparing the frames received on the skip and direct links of both channels, it is determined that the frame forwarded form the primary receive-from link for a given channel does not match the frames received on the other channel and the frame from the non-selected link does match the frames from the other channel, the node sets the non-selected link as the default or primary receive-from link for future received frames. In this way a faulty link or node can be isolated in future transmissions.

In addition, in some embodiments, a hop count value is added to forwarded frames to aid in identifying faults. For example, each of the receiving nodes is configured to increment a hop count field in the message data transmitted from the sending nodes (e.g. nodes B and C in this example) prior to forwarding the received data to other nodes 102. In addition, each receiving node compares the incremented hop count value of the data received over channel 110 to the incremented hop count value of the data received over channel 112 in order to qualify the self-checking pair action of self-checking pair 114. In other words, the hop count is used by each of the receiving nodes to detect if one of the nodes in the self-checking pair 114 is masquerading as a pair which could compromise the directional integrity of the data if the single node is transmitting different data on each channel. In addition, the hop count is not limited to detecting a self-checking pair masquerade, but can be used to detect other masquerading node faults.

In particular, each receiving node performs a calculation using a hop count value from each channel 110/112 and compares the result of the calculation to one or more allowed values. In particular, the allowed values include the total number of nodes, N, in the network or the total number of nodes minus one (N−1). For example, in one embodiment, the sending nodes (node C and B in this example) of the self-checking pair 114 are each configured to set the initial hop count to zero. Each receiving node is configured to increment the hop count for the respective link over which the data is received. For example, in this embodiment, the receiving nodes are configured to increment the hop count of messages received over direct links 108 by "1" and to increment the hop count of messages received over skip links 106 by "2". After incrementing the hop count, each receiving node sums the hop count value from channel 110 with the hop count value from channel 112. If the sum of the hop count does not equal N−1, the receiving node determines that a fault has occurred.

In some embodiments implementing a virtual self-checking pair, as described in co-pending U.S. application Ser. No. 13/350,304, the allowed values for the hop count are relaxed. For example, in addition to allowing a value of N−1, a value of N is also allowed. By allowing the sum of the hop count to equal N, network 100 enables greater availability of the sending node in the event that the one of the nodes of the virtual self-checking pair fails passively or actively. In particular, if one of the nodes in the virtual self-checking pair transmits data on channel 110 that is identical to, or within an acceptable bounded tolerance level of, the data transmitted on channel 112, the receiving nodes are still able to use the data regardless of the actions of the other node in the virtual self-checking pair if the sum of the hop count is equal to N.

In addition, each node 102 is configured to prevent the hop count value from being negative or below zero. For example, if a node receives a hop count value with a negative value, the node is configured to set the hop count value to the initial value (zero in this example) and then perform the corresponding increment of the hop count value. In this way, a node is not able to prevent false hop count values. If a node attempts to impersonate another node by modifying the hop count value to be negative, the hop count calculation performed by each receiving node will result in a number that is not equal to an allowed or accepted value by not allowing the hop count value to be less than zero. Therefore, a node is unable to create a false hop count value to be received over the two channels that will sum to the allowed value at each receiving node.

In other embodiments, other calculations and/or increment values are used. For example, in some embodiments, the nodes of the self-checking pair 114 are configured to set the initial count value to the total number of nodes, N. Each receiving node is then configured to decrement the hop count value of messages received over direct links 108 by "1" and to decrement the hop count value of messages received over skip links 106 by "2". In such embodiments, after decrementing the hop count values, each receiving node sums the decremented value from channel 110 to the decremented value from channel 112. If the sum of the hop counts does not equal N−1, or a multiple thereof, the receiving node determines that a fault has occurred.

In other embodiments, the initial hop count value is set to "1" and each receiving node is configured to multiply the hop count value by a predetermined amount. For example, in some such embodiments, the receiving nodes are configured to multiply the hop count value received over direct links 108 by "2" and to multiply the hop count value received over skip links 106 by "4". After multiplying the hop counts values received from each respective channel, each receiving node is configured to multiply the hop count value from channel 110 by the hop count value from channel 112. Each receiving node then compares the log base two of the resultant product to the total number of nodes. If the log base 2 of the product is not equal to the total number nodes minus one, then a fault is declared.

It is to be understood that other calculations or variations of the calculations described above can be used in other embodiments. For example, in some embodiments, each receiving node is configured to increment the hop count value received over the direct links 108 by "2" and to increment the hop count value received over the skip links by "4". Each of the receiving nodes sums the incremented hop count value from channel 110 with the incremented value from channel 112 and compares the sum to 2*(N−1) (or 2*N for a virtual self-checking pair). In other embodiments, the initial hop count value is set to zero on one channel and to the total number of nodes, N, on the other channel. In such embodiments, each receiving node is configured to increment the hop count value for the channel having an initial value of zero and to decrement the hop count value for the channel having an initial value equal to N.

Figure 4:
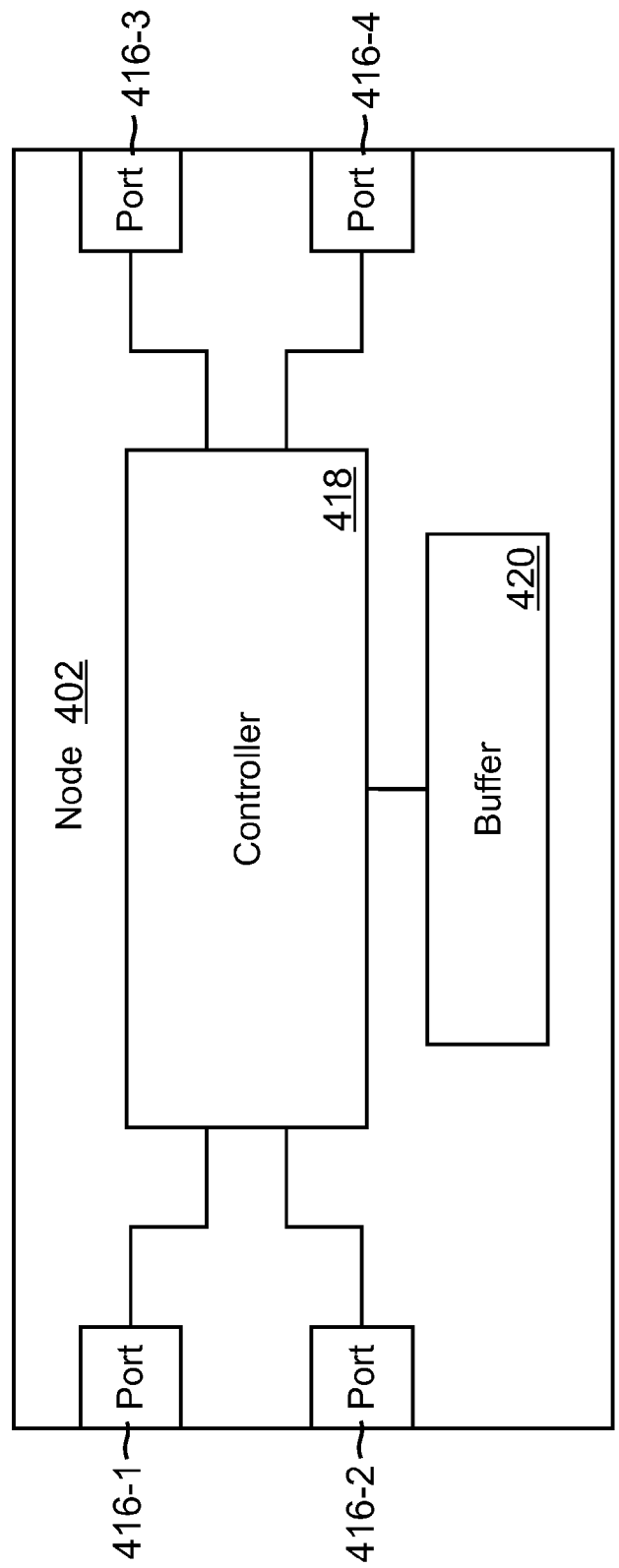
FIG. 4 is a block diagram of one embodiment of a node implemented in a communication network.

FIG. 4 is a block diagram of one embodiment of a node 402 implemented in a communication network, such as network 100 above, and configured to perform one or more of the techniques described herein. Node 402 includes a plurality of ports 416. In particular, node 402 includes a first port 416-1 configured to receive data on a first channel in a first direction from a first neighbor node adjacent to the node 402 via a direct link and to communicate data to the first neighbor node on a second channel in a second direction via the direct link. It is to be understood that in some embodiments, the links coupling the node 402 to other nodes are implemented using full-duplex bi-directional links and, in other embodiments, the links are implemented using half-duplex bi-directional links. In addition, as used herein, the term "communicating data" refers to either transmitting data or to forwarding data, whereas "transmitting" refers to outputting data that is sourced at the node 402 and "forwarding" refers to outputting data that is sourced from another node and received at node 402.

Node 402 also includes port 416-2 which is configured to receive data on the first channel from a first neighbor's neighbor node via a skip link and to communicate data to the first neighbor's neighbor node on the second channel via the skip link. Node 402 also includes port 416-3 which is configured to receive data from a second neighbor node on the second channel via a direct link and to communicate data on the first channel to the second neighbor node via the direct link. Node 402 also includes port 416-4 which is configured to receive data from a second neighbor's neighbor node on the second channel via a skip link and to communicate data to the second neighbor's neighbor node on the first channel via the skip link.

In addition, node 402 includes a controller 418. The controller 418 is configured to implement one or more of the techniques described above to reconstitute integrity based on received supplemental integrity data. As used herein, the term "supplemental integrity data" includes the status flag, integrity flag and/or the signaled reconstitution acknowledgment discussed above. However, the term "supplemental integrity data" does not include a copy of a frame or message.

In some embodiments, the controller 418 is configured to reconstitute the integrity of a received message based on the status flag and the integrity flag. In particular, the controller 418 compares the messages received over the skip and direct links on a given channel. The controller 418 also analyzes the status flag and the integrity flag. If one of the received frames has high integrity based on the integrity flag and the status flag of the frame received over the direct link from a neighbor node indicates that the frame was received at the neighbor node over a skip link, the controller 418 reconstitutes the integrity of the frame and sets the integrity flag to high for the forwarded frame. In addition, in some embodiments, the controller 418 is configured to update a field (e.g. a status flag) for forwarded frames which indicates from which port the forwarded frames/messages were received.

Alternatively, in some embodiments, the controller 418 reconstitutes the integrity based on receipt of a signaled reconstitution acknowledgment that indicates that a frame forwarded by the node 402 on one of the channels matches a frame communicated on the other channel.

In addition, the node 402 is configured to increment a hop count value for frames sourced from another node and received over one of the ports 416 at the node 402. For example, in some embodiments, the hop count value is a bit that is set in the hardware components at the physical layer of the node 402 by controller 418 prior to forwarding the frame. In other embodiments, the hop count value is incremented in the application layer by a processing unit running a higher level application.

As used herein the term "increments" is defined to include increasing the hop count value (i.e. incrementing by a positive value) and decreasing the hop count value (i.e. incrementing by a negative value). For example, in some embodiments, the hop count value is initially set to zero by the node which sources the data. In such embodiments, the controller 418 increases the received hop count value. In other embodiments, the hop count value is initially set to the total number of nodes in the network by the node which sources the data. In such embodiments, the controller 418 decreases the received hop count value. It is to be understood that the initial hop count value and the corresponding increment value can vary based on the implementation of the network. For example, in some embodiments, the initial value is set to '1' and the controller 418 is configured to multiply the received hop count value by '2'.

Furthermore, the increment value can be different for data received over a direct link than for data received over a skip link. In particular, if the skip link bypasses one or more nodes, the function used to increment the hop count value received over the skip link is configured to compensate for the nodes that are bypassed. For example, in some embodiments, the hop count value is increased by '1' if received over a direct link and is increased by '2' if received over a skip link that bypasses a single node. In other words, the function adds '1' to the hop count value received over the direct link and adds 'M+1' to the hop count value received over the skip link, where M is equal to the number of nodes bypasses by the skip link.

In addition, the node 402 is configured to increment the hop count value received over the first channel in the first direction and to increment the hop count value received over the second channel in the second direction. Indeed, in some embodiments, the increment value for the first channel is different than the increment value for the second channel. For example, in some embodiments, the hop count value is increased on the first channel and decreased on the second channel. In other embodiments, the increment value is the same for both channels.

The controller 418 is also configured to prevent the hop count value from being a negative value. In particular, if the received hop count value is a negative value, the node 418 is configured to set the hop count value to a default value and then increment the hop count value using the predetermined increment value. For example, in some embodiments, the default value is zero. In other embodiments, other default values such as '1' or the total number of nodes in the network.

By preventing a negative value in the hop count, node 402 helps prevent the node that sourced the frame from masquerading as a different node. In particular, in order to accept the frame for processing, in some embodiments, the controller 418 combines the hop count value received over the first channel with the hop count value received over the second channel. The controller 418 then compares the sum of the hop count values with a predetermined value. In particular, as described above, if the sum does not equal N−1, or a multiple thereof, where N is the total number of nodes in the network, the controller 418 determines that a fault has occurred. For example, since the frame is transported around the network in both the first and second directions, the hop count value is used to identify the node that sourced the frame. The source node cannot successfully act as a different node since the sum of the hop count values will not equal the proper predetermined value since a negative value is not permitted. In other words, the source node would need an initial negative value in at least one direction to masquerade as a different node and have the sum of the hop count values equal the predetermined allowed or accepted value or values.

In addition, by allowing the sum to equal N or N−1 for a virtual self-checking pair, the node 402 is able to accept the frame from the source node even if the source node is a member of a self-checking pair and one of the nodes in the virtual self-checking pair is faulty. That is, the controller 418 compares the frame received from the first channel to the frame received from the second channel. If the data matches and the hop count value is equal to N, the controller 418 accepts the frame from the source node as being non-faulty (i.e. having high integrity). Thus, a faulty node in the virtual self-checking pair does not prevent the availability of a functioning node of the virtual self-checking pair.

Furthermore, the controller 418 is configured, in some embodiments, to dynamically select the primary receive-from link/port for each channel. For example, if frames are received on ports 416-1 and 416-2, controller 418 selects the pre-defined primary receive-from port. Controller 418 then stores the frames received from ports 416-1 and 416-2 in buffer 420. Once corresponding frames are received on ports 416-3 and 416-4 from the other channel, controller 418 compares the frames. In particular, controller 418 compares the frame from port 416-1 to the frame from each of ports 416-3 and 416-4. Similarly, the controller 418 compares the frame from port 416-2 to the frame from each of ports 416-3 and 416-4. If the frame from the primary receive-from port, port 416-2 in this example, does not match the frames from ports 416-3 and 416-4 while the frame from port 416-1 does match the frames from ports 416-3 and 416-4, the controller 418 sets port 416-1 as the primary receive-from port. In addition, the controller 418 uses the hop count to qualify or verify the source of the received frames as part of the decision to select a default port, as described above.

Figure 5:
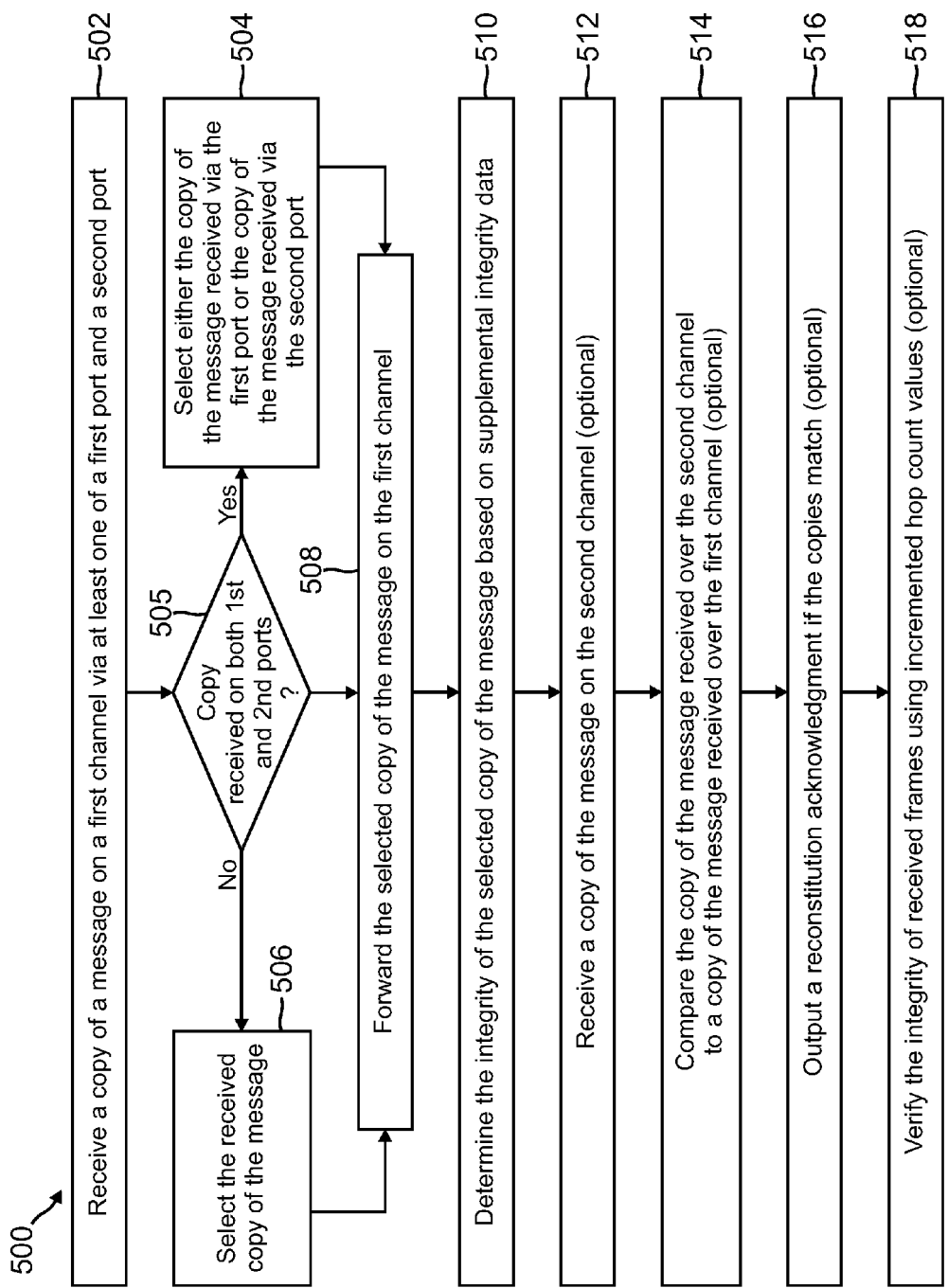
FIG. 5 is a flow chart depicting one embodiment of a method of communicating data in a network.

FIG. 5 is a flow chart depicting one embodiment of a method 500 of communicating data in a network, such as network 100. At block 502, a copy of a message is received on a first channel via at least one of a first port and a second port. The first port is coupled to a first neighbor node and the second port is coupled to a first neighbor's neighbor node. At block 504, either the copy of the message received via the first port or the copy of the message received via the second port is selected if a copy of the message is received via both the first port and the second port. Exemplary methods of selecting one of the ports for frame forwarding are described in more detail below with respect to FIG. 4 and FIG. 5. At block 506, if a copy of the message is only received via one of the first port or the second port, the received copy of the message is selected.

At block 508, the selected copy of the message is forwarded on the first channel to a second neighbor node via a third port and to a second neighbor's neighbor node via a fourth port. In some embodiments, forwarding the selected copy of the message includes communicating data on the first channel via the third and fourth ports that indicates from which port the forwarded copy of the message was selected. At block 510, the integrity of the selected copy of the message is determined based on supplemental integrity data received from another node. The supplemental integrity data is exclusive of a copy of the message communicated on a second channel. In some embodiments, the supplemental integrity data comprises an acknowledgment from another node in the network indicating that the selected copy of the message forwarded on the first channel matches a copy of the message communicated on the second channel. In other embodiments, the supplemental integrity data comprises a status flag and integrity flag. An exemplary method for determining the integrity of the selected message based on supplemental integrity data is described in more detail below with respect to FIG. 6.

At block 512, a copy of the message is optionally received on the second channel over one of the third port or the fourth port. At block 514, the copy of the message received over the third or fourth port is optionally compared to a copy of the message received over the first or second ports. At block 516, if the copy from the first channel matches the copy of the second channel, optionally outputting a reconstitution acknowledgment over the respective ports indicating that the copies match. For example, if the message received over the first port matches the copy received over the third port, the reconstitution acknowledgment is output over the first and third ports.

At block 518, the integrity of received frames is verified using incremented hop count values of messages received over the first channel and second channels. An exemplary method of checking the integrity of the received frames based on the hop count value is described in more detail below with respect to FIG. 7.

Figure 6:
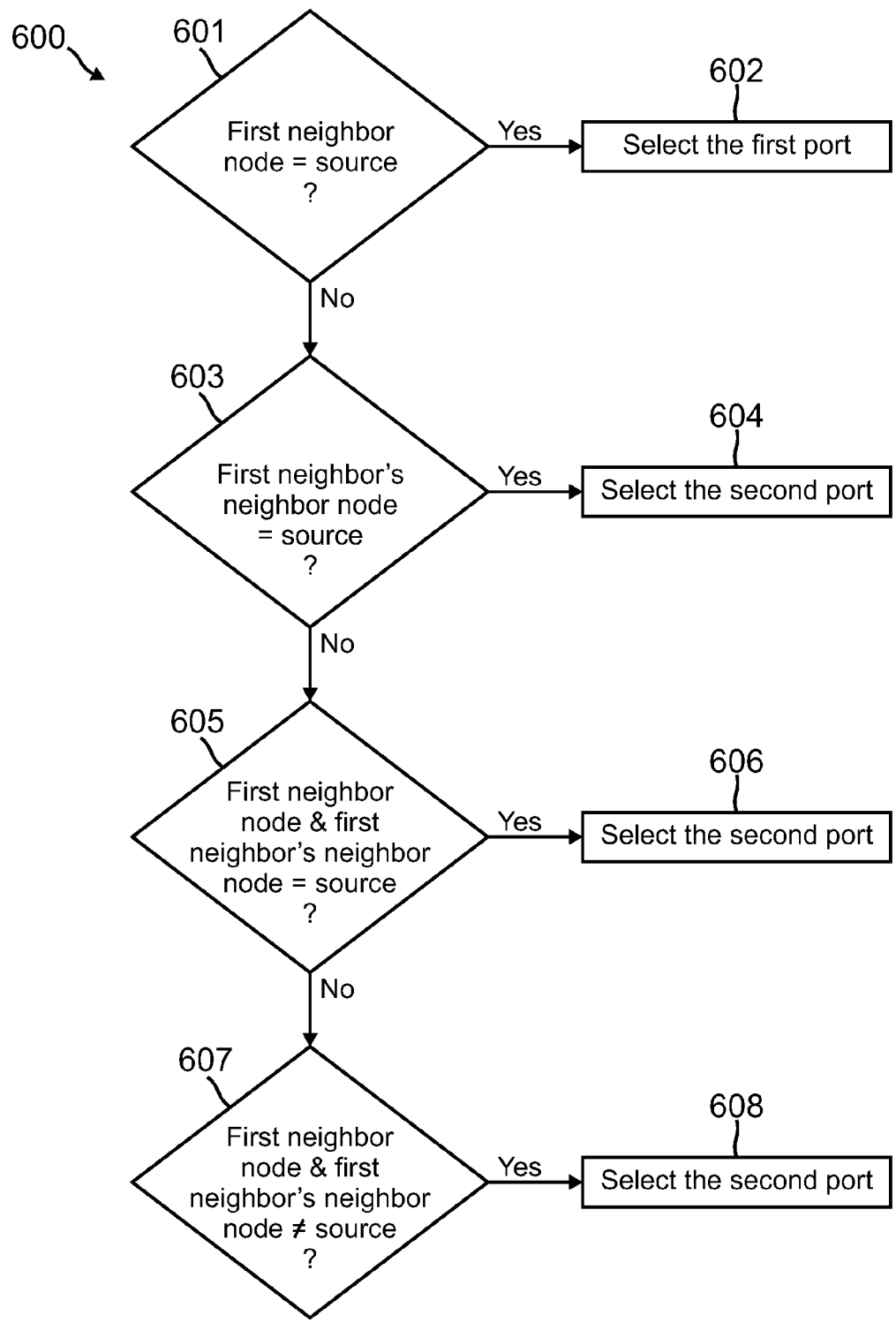
FIG. 6 is a flow chart of one embodiment of an exemplary method of selecting one of the ports in a node for frame forwarding.

FIG. 6 is a flow chart of one embodiment of an exemplary method 600 of selecting one of the ports in a node for frame forwarding. If the node's first neighbor node is the source of the message at block 601, selecting the first port at block 602. If the node's first neighbor's neighbor node is the source of the message at block 603, selecting the second port at block 604. If both the node's first neighbor node and the node's first neighbor's neighbor node source the message at block 605, selecting the second port at block 606. If neither the node's first neighbor node nor the node's first neighbor's neighbor node source the message at block 607, selecting the second port at block 608.

Figure 7:
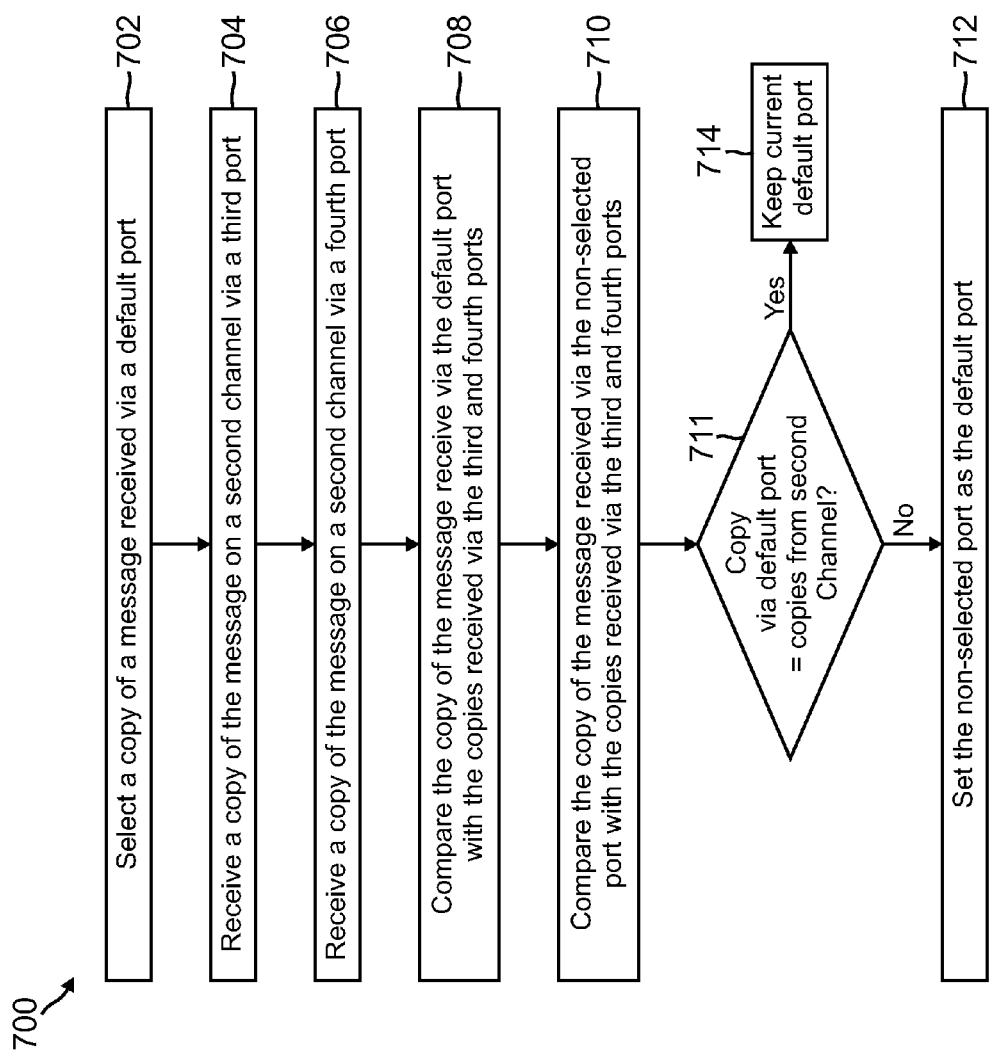
FIG. 7 is a flow chart of another embodiment of an exemplary method of selecting one of the ports in a node for frame forwarding.

FIG. 7 is a flow chart of another embodiment of an exemplary method 700 of selecting one of the ports in a node for frame forwarding. At block 702, a copy of a message received via a default port is selected. One of the first port and the second port on the first channel is initially identified as the default port for the first channel. The other port of the first port and the second port is a non-selected port. At block 704, a copy of the message on a second channel is received via a third port. At block 706, a copy of the message on the second channel is received via a fourth port.

At block 708, the copy of the message received via the default port is compared with the copies received via the third and fourth ports. At block 710, the copy of the message received via the non-selected port is compared with the copies received via the third and fourth ports. At block 712, if the copy of the message received via the default port does not match the copies received via the third and fourth ports and the copy of the message received via the non-selected port does match the copies received via the third and fourth ports, setting the non-selected port as the default port.

Figure 8:
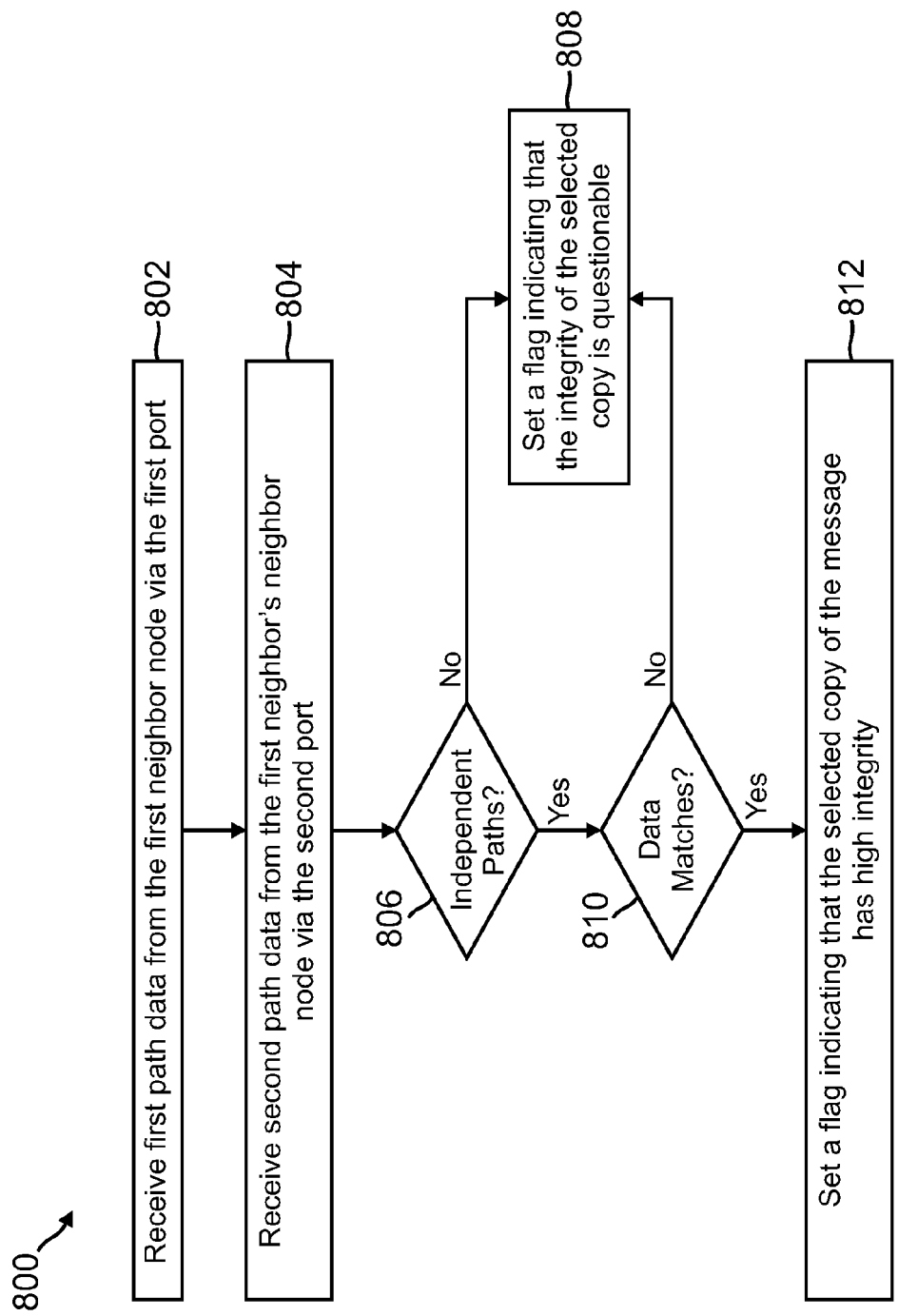
FIG. 8 is a flow chart of one embodiment of an exemplary method of determining the integrity of the selected message based on supplemental integrity data.

FIG. 8 is a flow chart of one embodiment of an exemplary method 800 of determining the integrity of the selected message based on supplemental integrity data. At block 802, first path data is received from the first neighbor node via the first port. The first path data identifies a path traveled by the respective copy of the message received via the first port. At block 804, second path data is received from the first neighbor's neighbor node via the second port. The second path data identifies a path traveled by the respective copy of the message received via the second port.

At block 806 it is determined if the first path data and the second path data identify independent paths. If the first and second path data do not identify independent paths, a flag indicating that the integrity of the selected copy is questionable is set at block 808. If the first path data and the second path data identify independent paths, it is determined at block 810 if the data from the first port matches the data from the second port. If the data from the first port does not match the data from the second port, a flag indicating that the integrity of the selected copy is questionable is set at block 808.

At block 812, if the first path data and the second path data identify independent paths and the copy of the message received over the first port matches the copy of the message received over the second port, a flag indicating that the selected copy of the message has high integrity is set.

FIG. 9 is a flow chart of one embodiment of a method 900 for checking the integrity of the received data based on the hop count value. At block 902, data including a hop count value is received over a first channel in a first direction. At block 904, the hop count value from the first channel is incremented, as described above. One embodiment of a method of incrementing the hop count value is shown in FIG. 10.

At block 906, data including a hop count value is received over a second channel in a second direction. At block 908, the hop count value from the second channel is incremented. At block 910, the incremented hop count value from the first channel is combined with the incremented hop count value from the second channel. For example, the hop count values can be summed or multiplied with each other. At block 912, the combined hop count values are compared to a predetermined allowed value. In particular, the allowed value is N−1, or a multiple of N−1, where N is the total number of nodes in the network. In addition, for embodiments implementing a virtual self-checking pair, the allowed value can also include N or a multiple of N.

If the combined hop count value does not equal the predetermined allowed value, an error is declared at block 914. If the combined hop count value is equal to the predetermined value, the data received over the first channel is compared to the data received over the second channel, at block 916. If the data received over the first channel matches the data received over the second channel, the data is accepted as having integrity for further processing at block 918. If the data over the first channel does not match the data received over the second channel, an error is declared at block 914.

FIG. 10 is a flow chart of one embodiment of a method 1000 for incrementing the hop count value at each of the receiving nodes. At block 1002, it is determined if a received hop count value is less than zero. If the hop count value is less than zero, the hop count value is set to a default value at block 1004, as described above. The default hop count value is then incremented at block 1006, using the techniques discussed above. If the hop count value is not less than zero, the received hop count value is incremented at block 1008.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of communicating data in a network, the method comprising:
    receiving a copy of a message on a first channel via at least one of a first port and a second port, the first port coupled to a first neighbor node and the second port coupled to a first neighbor's neighbor node;
    selecting either the copy of the message received via the first port or the copy of the message received via the second port if a copy of the message is received via both the first port and the second port;
    if a copy of the message is only received via one of the first port or the second port, selecting the received copy of the message;
    forwarding the selected copy of the message on the first channel to at least one of a second neighbor node via a third port or a second neighbor's neighbor node via a fourth port; and
    determining the integrity of the selected copy of the message based on supplemental integrity data received from another node, wherein the supplemental integrity data is exclusive of a copy of the message communicated on a second channel;
    wherein the supplemental integrity data includes one of:
        an acknowledgment received from another node in the network that received the selected copy of the message forwarded on the first channel, the acknowledgment indicating that the selected copy of the message forwarded on the first channel matches a copy of the message communicated via an independent path on the second channel; or
        first path data received from the first neighbor node via the first port and second path data received from the first neighbor's neighbor node via the second port, wherein the first path data identifies at least a portion of a path traveled by the respective copy of the message received via the first port and the second path data identifies at least a portion of a path traveled by the respective copy of the message received via the second port.

2. The method of claim 1, wherein receiving a copy of the message on the first channel comprises receiving a copy of the message via both the first port and the second port; and
    wherein determining the integrity of the selected copy of the message based on the supplemental integrity data comprises:
        if the first path data and the second path data identify independent paths and the copy of the message received over the first port matches the copy of the message received over the second port, setting a flag indicating that the selected copy of the message has high integrity; and
        if the first path data and the second path data do not identify independent paths or the copy of the message received over the first port does not match the copy of the message received over the second port, setting a flag indicating that the integrity of the selected copy is questionable.

3. The method of claim 1, wherein selecting either the copy of the message received via the first port or the copy of the message received via the second port comprises:
    selecting the copy of the message received via a default port, wherein one of the first port and the second port is the default port and the other port of the first port and the second port is a non-selected port;
    receiving a third copy of the message on the second channel via the third port;
    receiving a fourth copy of the message on the second channel via the fourth port;
    comparing the copy of the message received via the default port with the third and fourth copies of the message;
    comparing the copy of the message received via the non-selected port with the third and fourth copies of the message;
    if the copy of the message received via the default port does not match the third and fourth copies of the message and the copy of the message received via the non-selected port does match the third and fourth copies of the message, setting the non-selected port as the default port.

4. The method of claim 1, further comprising:
    receiving a copy of the message on the second channel via at least one of the third port and the fourth port;
    comparing the copy of the message received on the first channel with the copy of the message received on the second channel;
    if the copy of the message received on the first channel matches the copy of the message received on the second channel, outputting an acknowledgment on the second channel indicating that the copy of the message on the first channel matches the copy of the message on the second channel.

5. The method of claim 1, further comprising:
    communicating data on the first channel via the third and fourth ports that indicates from which port the forwarded copy of the message was selected.

6. A method of communication data in a network, the method comprising:
    receiving a copy of a message on a first channel via at least one of a first port and a second port, the first port coupled to a first neighbor node and the second port coupled to a first neighbor's neighbor node;
    selecting either the copy of the message received via the first port or the copy of the message received via the second port if a copy of the message is received via both the first port and the second port;
    if a copy of the message is only received via one of the first port or the second port, selecting the received copy of the message;
    forwarding the selected copy of the message on the first channel to at least one of a second neighbor node via a third port or a second neighbor's neighbor node via a fourth port;
    determining the integrity of the selected copy of the message based on supplemental integrity data received from another node, wherein the supplemental integrity data is exclusive of a copy of the message communicated on a second channel;
    determining if a received hop count value for the copy of the message received over the first channel is less than zero;
    if the received hop count value is not less than zero, incrementing the received hop count value;
    if the received hop count value is less than zero, setting the hop count value to a default value and incrementing the default value;
    summing the incremented hop count value for the first channel with an incremented hop count value for the second channel; and
    accepting the message if the sum is equal to a predetermined allowed value.

7. The method of claim 1, wherein selecting either the copy of the message received via the first port or the copy of the message received via the second port further comprises:

if the first neighbor node is the source of the message, selecting the first port;
if the first neighbor's neighbor node is the source of the message, selecting the second port;
if both the first neighbor node and the first neighbor's neighbor node source the message, selecting the second port; and
if neither the first neighbor node nor the first neighbor's neighbor node source the message, selecting the second port.

8. A communication node comprising:
a plurality of ports comprising:
   a first port configured to receive data on a first channel from a first neighbor node adjacent to the node and to communicate data to the first neighbor node on a second channel;
   a second port configured to receive data on the first channel from a first neighbor's neighbor node and to communicate data to the first neighbor's neighbor node on the second channel;
   a third port configured to receive data from a second neighbor node on the second channel and to communicate data to the second neighbor node on the first channel; and
   a fourth port configured to receive data from a second neighbor's neighbor node on the second channel and to communicate data to the second neighbor's neighbor node on the first channel; wherein the communication node further comprises:
a controller configured to process data received over one or more of the plurality of ports;
wherein, when integrity of a message received on the first channel is uncertain, the controller is configured to reconstitute the integrity of the received message based on supplemental integrity data received from another node without comparing the message received on the first channel with a copy of the message received on the second channel;
wherein the supplemental integrity data includes one of:
   an acknowledgment received from another node in the network that received the selected copy of the message forwarded on the first channel, the acknowledgment indicating that the selected copy of the message forwarded on the first channel matches a copy of the message communicated via an independent path on the second channel; or
   first source data received over the first port from the first neighbor node and second source data received over the second port from the first neighbor's neighbor node; wherein the first source data identifies over which port the first neighbor node received a copy of the message that the first neighbor node communicated to the first port and the second source data identifies over which port the first neighbor's neighbor node received a copy of the message that the first neighbor's neighbor node communicated to the second port.

9. The communication node of claim 8, further comprising:
a buffer configured to store received messages;
wherein, the second port is a default port for the first channel;
wherein, when a copy of a message is received on the first and second ports, the controller is configured to forward the copy of the message received via the default port;
wherein the copy of the message received over the first port and the copy of the message received over the second port are stored in the buffer;
wherein the controller is configured to compare the respective copies of the message received over the first and second ports on the first channel with respective copies of the message received over the third and fourth ports on the second channel; and
wherein the controller is configured to set the first port as the default port if the copy of the message received via the second port does not match the respective copy of the message received via the third and fourth ports and if the copy of the message received via the first port does match the respective copy of the message received via the third and fourth ports.

10. The communication node of claim 8, wherein a copy of the message is received over the first port and the second port on the first channel;
wherein, when one of the copies of the message received over the first and second ports is flagged with trusted integrity and the other copy is flagged with uncertain integrity, the controller is configured to reconstitute the integrity of the message if the copy received over the first port matches the copy received over the second port and if the first and second source data indicate that the first neighbor node and the first neighbor's neighbor node each received the respective copy of the message from a respective neighbor's neighbor node.

11. The communication node of claim 8, wherein the controller is further configured to determine
   if a hop count value in the received message is less than zero;
      wherein the at least one node is configured to increment the hop count value if the hop count value is not less than zero;
      wherein, if the hop count value is less than zero, the controller is configured to set the hop count value to a default value and to increment the default value;
      wherein the controller is further configured to sum the incremented hop count value for the message received over the first channel with an incremented hop count value for a corresponding message received over the second channel and to accept the message if the sum is equal to a predetermined allowed value.

12. The communication node of claim 8, wherein the controller is configured to select either the message received from the first port or the message received from the second port and to forward the selected message along the first channel via the third port and the fourth port; wherein the controller is further configured to update a field in the selected message which indicates from which port the selected message was received.

* * * * *